Figure 1:
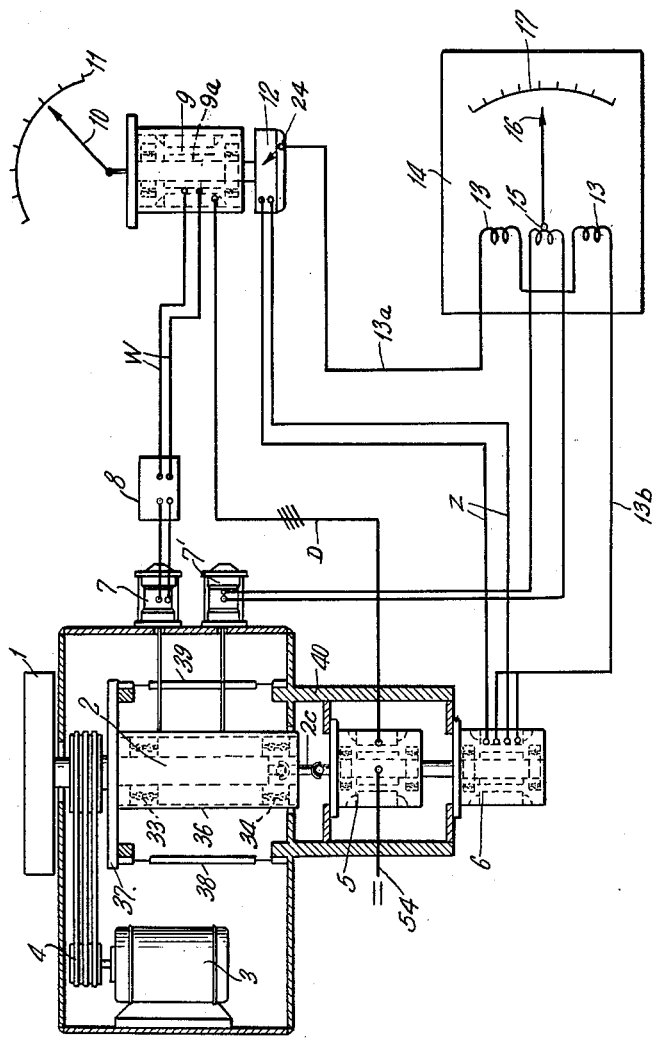

Oct. 22, 1963 H. HACK 3,107,538
MEANS FOR MEASURING UNBALANCE IN ROTATING WORKPIECES
Filed June 20, 1958 2 Sheets-Sheet 1

Oct. 22, 1963 H. HACK 3,107,538
MEANS FOR MEASURING UNBALANCE IN ROTATING WORKPIECES
Filed June 20, 1958 2 Sheets-Sheet 2
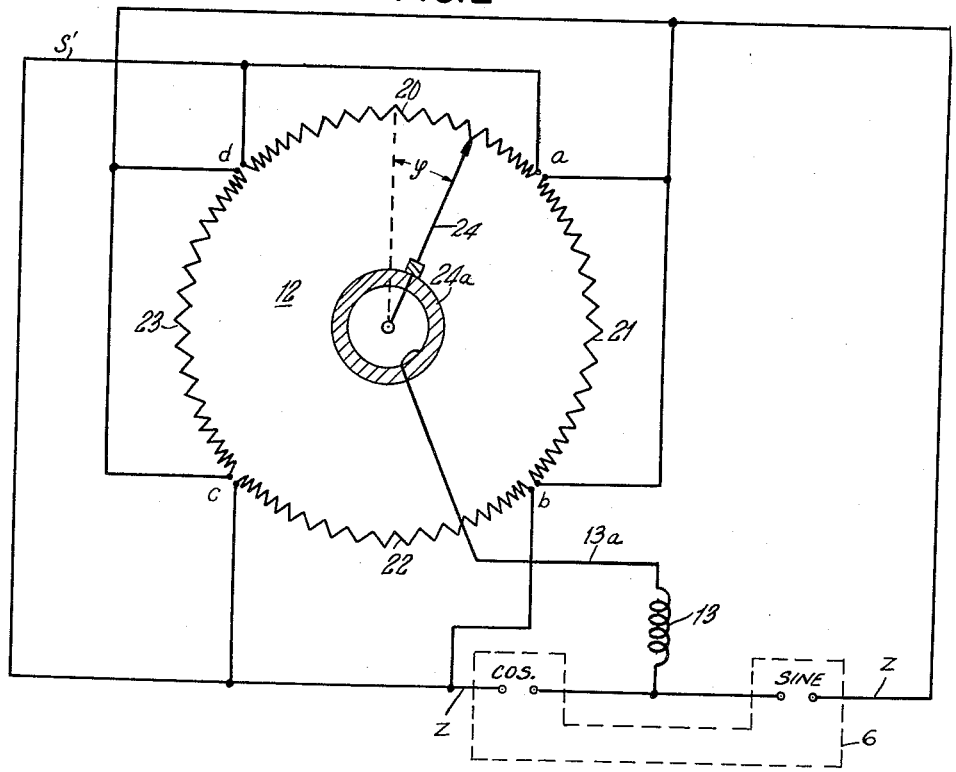
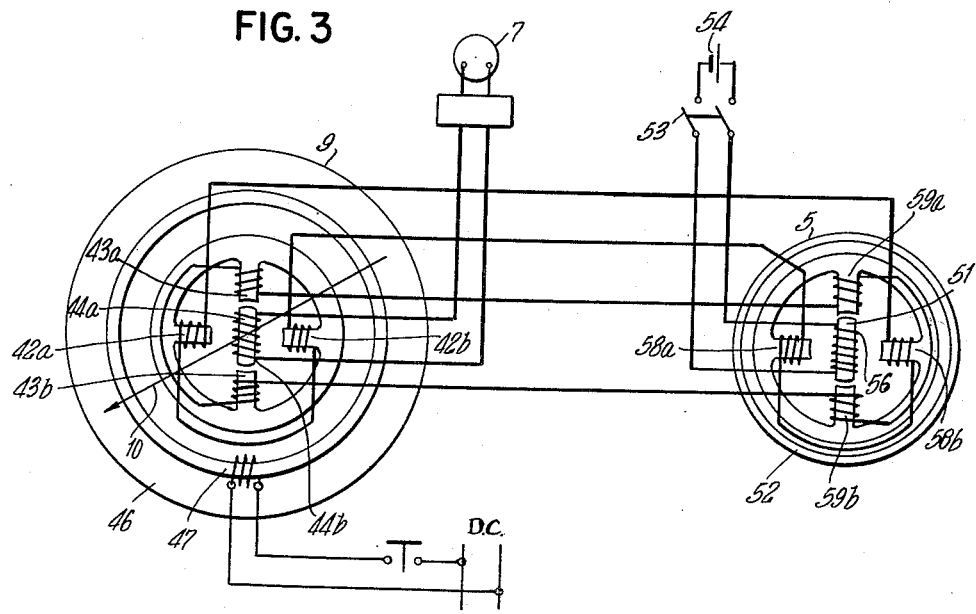

United States Patent Office 3,107,538
Patented Oct. 22, 1963

3,107,538
MEANS FOR MEASURING UNBALANCE
IN ROTATING WORKPIECES
Heinrich Hack, Darmstadt, Germany, assignor to Carl Schenck Maschinenfabrik G.m.b.H., Darmstadt, Germany, a corporation of Germany
Filed June 20, 1958, Ser. No. 743,350
Claims priority, application Germany June 21, 1957
3 Claims. (Cl. 73—463)

The invention relates to means for determining the magnitude and phase position of an unbalance of a rotating workpiece, and is related to the invention disclosed in my copending application Serial No. 606,929, filed August 29, 1956, now Patent No. 2,933,984.

According to known methods, the magnitude and phase position of an unbalance in a rotating workpiece is determined by translating the mechanical unbalance-responsive oscillations of the workpiece into electric alternating voltages with the aid of oscillation pickups which are connected in series relation to each other in the moving-coil circuit of a dynamometric measuring instrument such as a wattmeter. The fixed field coil of the same measuring instrument is simultaneously excited by an alternating current so controlled as to maintain an accurate phase relation to the rotation of the workpiece. The magnitude of the excitation current thus passing through the field coil of the instrument is constant and independent of the rotating speed of the workpiece. In many cases, the excitation current, having approximately sinusoidal wave shape, is obtained by imposing a sinusoidal modulation upon a direct current. By sequentially supplying the field coil with two such currents 90° phase displaced from each other, the instrument can be made to indicate the unbalance in form of two coordinate components 90° displaced from each other.

According to another method, the housing and stator of a phase-reference transmitter in whose rotor the alternating current for exciting the field coil is generated in accurate phase relation to the rotation of the workpiece, is turned about the generator axis until the current of the phase reference transmitter is in phase with the voltages produced in the mechanical-electrical oscillation pickups. Then the measuring instrument exhibits a maximum deflection indicative of the magnitude of unbalance, and the angular amount of stator displacement needed to produce such maximum deflection in the instrument is indicative of the angular location of the mass center of the unbalance.

The known methods are not well suitable for use in fully automatic balance-correcting plants because they require either a partially manual actuation or very complicated devices.

According to the method and means disclosed in the above-mentioned application Serial No. 606,929, the measurement of the angular position of the unbalance is performed automatically by means of electrical devices. It is an object of the present invention to improve that method in such a manner that the magnitude of the unbalance is likewise measured automatically. Another object of the invention is to require for such fully automatic performance no special instruments or special devices but merely commercially available equipment.

To achieve these objects and in accordance with a feature of my invention, the amplitude of the alternating current that excites the fixed field coil of the dynamometric or wattmetric instrument to serve as a phase reference for the unbalance-responsive pickup voltages, is varied in dependence upon the variable phase position of the alternating current that is controlled to maintain an accurate phase relation to the rotation of the workpiece.

Another feature of my invention resides in means for obtaining the just-mentioned amplitude variation of the alternating current exciting the field coil. A measuring instrument for indicating the phase position of the alternating current controlled by the rotation of the workpiece is coupled with a potentiometer from which corresponding sine-values and cosine-values can be taken off in dependence upon the indicated phase angle. These current values are supplied to the field coil of the wattmetric instrument.

However, the variation of the sine and cosine values may also be effected by methods known as such, for example, by means of a rotary-type transformer.

The invention will be further explained with reference to the embodiment of a machine according to the invention illustrated on the drawings, in which:

FIG. 1 shows schematically a vertical-type balancing apparatus according to the invention, FIG. 2 is a schematic circuit diagram of the potentiometric device used in the same apparatus as part of an unbalance-magnitude indicator; and FIG. 3 is a circuit diagram of the unbalance-angle indicating means of the same apparatus.

The workpiece 1 to be balance-analyzed is mounted on a vertical spindle 2 driven from a motor 3 through a belt transmission 4. The spindle 2 is journaled by means of ball-bearings 33, 34 in a supporting structure 36 which comprises a bridge piece 37 mounted on vertically rigid struts 38, 39 each of which has resilient, leaf-spring portions at its respective two ends and is firmly secured at the bottom end to the frame structure 40 of the machine. During rotation of the workpiece, the centrifugal force caused by any unbalance causes the workpiece with spindle 2, support 36, and bridge piece 37 to perform horizontal oscillations in the plane of illustration which are in synchronism with the workpiece rotation.

Mounted on the lower portion of spindle 2 are a rotating-field transmitter 5 and a phase-reference transmitter 6. The phase-reference transmitter 6 is essentially a generator which produces two alternating currents 90° phase displaced relative to each other. Due to the mechanical coupling 2c between transmitters 5, 6 and workpiece 1, the two transmitters 5, 6 rotate in synchronism with the workpiece so that the voltages produced by the respective transmitters 5, 6 are also in synchronism with the unbalance oscillations. The bottom end of spindle 2 is joined by means of articulated shaft 2c to the rotary field transmitter 5 which is fed from a source of D.C. current 54 (designated by =), and in a known manner to phase reference transmitter 6. The deflections of spindle 2, caused by the oscillations, are sensed by two electrodynamic pickups 7 and 7' and are translated into respective electric voltages.

The pickup 7 is connected through an amplifier 8 with the rotating coil of a rotating-field receiver 9 which is essentially a phase-angle indicating instrument. The receiver 9 is provided with a pointer 10 which moves over a scale of indicia 11 and indicates the phase position of the unbalance or unbalance-responsive deflection relative to a reference point of the workpiece. Connected to the receiver 9 is a potentiometer rheostat 12 so that the movable tap contact 24 (FIG. 2) of the potentiometer rotates together with the phase-angle indicating pointer 10 of receiver 9. The two 90° phase-displaced currents of the phase reference transmitter 6, as will be explained below with reference to FIG. 2, are supplied to the potentiometer 12 through leads 2. The tap contact of the potentiometer takes varying current values off the potentiometer in accordance with the phase position indicated by pointer 10; and these varying amounts of current are supplied to the field coil 13 of the wattmeter 14. The pickup 7' is electrically connected with the moving coil 15 of wattmeter 14. Consequently, the pointer 16 of wattmeter 14 indicates on the instrument scale 17 automatically the magnitude of the unbalance. The amplitude of the pickups 7 and 7' varies from case to case depending upon the magnitude of the unbalance amplitude.

As shown in FIG. 2, the resistance winding of the potentiometer 12 is ring-shaped and is divided into four quadrants 20, 21, 22, 23 which are completely symmetrical relative to each other. The winding scheme in each quadrant corresponds to the sine-cosine function. The tap contact 24 of the potentiometer is angularly displaceable 360°. The tapped-off voltage is supplied through slip rings 24a (FIG. 2) and a lead 13a to the field coil 13 of the wattmeter 14. When the phase angle $\varphi$ is larger than 45° and analogously located in a quadrant other than the one denoted by 20, the sine current of phase transmitter 16 is tapped off in lieu of the cosine current.

The transmitter 5 and the receiver 9 shown in FIG. 1 correspond essentially to those described in the above-mentioned copending application Serial No. 606,929 with reference to respective items 222 and 201 in FIGS. 9 and 11 thereof. However, the design and electric interconnection of these unbalance-angle measuring devices will be described below with reference to FIG. 3 of the present disclosure.

The receiver 9 is essentially a moving-coil instrument and may be a cosine $\phi$, Bruger type measuring device as described in U.S. Patent 2,933,984, in FIG. 9, item 201 thereof. Its stationary field structure has two pole pairs 42a, 42b and 43a, 43b displaced 90° relative to each other. A moving coil 44a is mounted between the pole pairs on an armature 44b rotatable 360°. The armature 44b carries the indicating pointer 10 movable along the scale 11 (FIG. 1) whose scale division, however, covers the entire range of 360°. The instrument housing carries a magnetizable ring 47 capable of attracting, when excited, a corresponding armature member on pointer 10 for the purpose of arresting the pointer 10 in the indicating position.

The moving coil 44a is connected through the amplifier 8 with the oscillation pickup 7 as explained above with reference to FIG. 1. The field coils of instrument 9, located on the respective poles are connected with the transmitter 5, whose design is similar to that of instrument 9. The armature 51 of transmitter 5 is connected with the spindle 2 of the balancing apparatus to rotate together therewith, whereas the stator or housing 52 of transmitter 5 is stationary. The moving coil 56, mounted on armature 51 of transmitter 5, is energized through a switch 53 from a suitable source 54 of direct current. The stator 52 comprises four poles 58a, 58b and 59a, 59b, the two pairs being 90° displaced from each other. The transmitter windings mounted on the respective poles are connected with the corresponding pole windings of the receiver 9 as illustrated.

The apparatus functions as follows:

When a workpiece 1 is mounted on spindle 2 and driven to rotate at the speed desired for the balancing operation, the transmitter 5 has its rotor winding 56 energized by direct current from source 54 and passes from its coil pair 58a, 58b a sine-wave current through the instrument coils 42a, 42b from the stator of the transmitter 5 through the two-phase (////) line D to the stator of receiver 9. The four slant lines indicate that four wires are used. Simultaneously, a cosine-wave current passes from transmitter coil pair 59a, 59b through the instrument coils 43a, 43b. Assuming that the workpiece 1 is unbalanced, the bearing assembly performs oscillations within a horizontal plane with an oscillation amplitude proportional to the amount of unbalance. These oscillations are translated by the electrodynamic pickup 7 into alternating voltages through the two-pole line W which are applied to the moving coil 44a of instrument 9. As a result, the moving coil with the instrument pointer 10 adjusts itself to a deflection corresponding to the phase angle displacement between the pickup voltage and the rotary field of the transmitter 5. The angular position of the workpiece unbalance is then directly indicated by the pointer 10. As explained, the potentiometric device 12 actuated or controlled by the receiver instrument 9 is simultaneously effective to vary the amplitude of the phase reference current supplied to the stationary field coils 13 of the wattmetric instrument 14, thus controlling the deflection of the moving coil 15, which is excited by voltage from pickup 7', to directly indicate a value indicative of the magnitude of the unbalance. All quadrants 20, 21, 22, 23 of the potentiometer 12 are supplied with current from the phase transmitter 6. The tap contact 24, on the same shaft 9a as the pointer 10, adjusts itself automatically so that, for example, the field coils 13 of the measuring instrument 14 are excited by a current dependent upon the phase angle $\varphi$. Consequently the pointer 16 indicates on the scale 17 the unbalance magnitude N independently of the angular position of the unbalance. This is because the indication $$N = U \cdot \cos \varphi \cdot \frac{I}{\cos \varphi}$$

hence:
$N = U \cdot I$
$U$ = pickup voltage
$I$ = auxiliary-generator current

Both magnitudes can be utilized for manual or automatic control of the unbalance correcting machining of the workpiece with conventional means.

Consequently, during a balancing run of the workpiece the instrument 9 indicates the phase position of the unbalance and the instrument 14 simultaneously indicates the unbalance magnitude. Both values may be read off or may be transmitted to the unbalance correcting devices which can thus be readily controlled to automatically eliminate the unbalance, for instance, by positioning the workpiece under control by instrument 9 and then drilling or otherwise machining the workpiece to an extent controlled by the instrument 14. Such automatic control of the machining operation is not part of the present invention proper and may be similar to the control described in the above-mentioned copending application Serial No. 606,929 with reference to FIGS. 8 to 11.

The wattmetric system of the invention acts to filter out all disturbing oscillations. In contrast thereto, the use of a voltmeter requires the interposition of electric filtering devices for obtaining accurate results, and such filter devices are often a source of trouble. A geometric addition by means of a calculating table is not necessary with wattmetric systems for determining the resulting unbalance. Separate indications are obtained by the wattmeric system for magnitude and angle of unbalance.

The advantage of the described device resides in the fact that a remote control of the measuring device is afforded and that automatic measuring apparatus can be built up with relatively small expenditure in mechanical devices.

It will be apparent to those skilled in the art, upon studying this disclosure, that my invention permits of various modifications as regards the design and interconnection of the system components and may be embodied in apparatus other than illustrated and described herein, without departing from the essentials of the invention and within the scope of the claims annexed hereto.

I claim:

1. Apparatus for determining characteristics of unbalance of a rotating workpiece, comprising oscillatorily mounted workpiece holder means for rotating the workpiece, voltage-producing pickup means responsive to unbalance oscillation of the holder means, the voltage of said pickup means varying in amplitude with the magnitude of unbalance, an electric transmitter coupled with said holder means to operate in synchronism with the workpiece rotation, a receiver connected with said pickup means and with said transmitter and having a member movable in accordance with the phase position of the pickup voltage relative to the phase of the transmitter, a generator of substantially sinusoidal current coupled with said holder means whereby said current is synchronous with the workpiece rotation, a multiplying wattmetric instrument having a stationary field coil and having a moving coil connected to said pickup means, a potentiometer device having resistance means electrically connected to said generator to be traversed by said current and having a tap contact engaging said resistance means and being displaceable relative thereto, the resistance of said potentiometer device varying sinusoidally according to the displacement of said tap contact, said tap contact being connected with said receiver member to move together and in fixed phase relation therewith, and said stationary coil being electrically connected to said generator through said tap contact and said resistance means whereby the amplitude of the current in said stationary coil is varied in dependence upon said phase position.

2. Apparatus for determining the magnitude and phase position of unbalance of a rotating workpiece, comprising oscillatorily mounted workpiece holder means for rotating the workpiece, voltage-producing pickup means responsive to unbalance oscillation of the holder means, the voltage of said pickup means varying in amplitude with the magnitude of unbalance, an electric transmitter coupled with said holder means to operate in synchronism with the workpiece rotation, a receiver connected with said pickup means and with said transmitter and having a member movable in accordance with the phase position of the pickup voltage relative to the phase of the transmitter, a generator of substantially sinusoidal current coupled with said holder means whereby said current is synchronous with the workpiece rotation, a dynamoelectric instrument having a stationary field coil and having a moving coil connected to said pickup means, a potentiometer device having resistance means connected to said generator to be traversed by said current, said device having a tap contact engaging said resistance means and being displaceable relative thereto, said tap contact being connected with said receiver member to move together therewith, and said stationary coil being connected to said generator through said tap contact and said resistance means, said generator having two output circuits whose respective voltages are 90° phase displaced relative to each other, said receiver member having a path of movement corresponding to a range of 360° phase displacement, said resistance means forming a ring-shaped resistor structure and having four symmetrical quadrants sequentially contactable by said tap contact, each quadrant being connected across one of said generator output circuits different from that to which the next adjacent quadrant is connected, and each quadrant having a substantially sinusoidal resistance graduation between the ends of the quadrant.

3. A system for determining some of the characteristics of unbalance of a rotating workpiece, said system comprising oscillatorily mounted workpiece holder means for rotating the workpiece, voltage producing pickup means responsive to unbalance oscillation of the holder means, the voltage of said pickup means varying in amplitude with the magnitude of unbalance, a multiplying wattmetric dynamoelectric instrument having a movable coil and a stationary field coil, said pickup means being operably connected to one of said coils for energizing said one coil in accordance with said pickup voltage, transmitter means coupled with said holder means for providing an alternating reference voltage in synchronism with the rotation of said holder means, electric measuring means connected to said transmitter means and said pickup means for measuring the phase position of the unbalance-responsive voltage, and a variable electric resistance network having control means connected to said measuring means for varying the resistance of said network according to the phase value measured by said measuring means, circuit means connecting said electric resistance network and said transmitter means to the other coil of said wattmetric instrument for energizing the other coil with said transmitter means according to the variation of said resistance network, the resistance value of said network being varied by operation of said control means to compensate for the effect upon said instrument of phase difference between said transmitter means and said pickup means.

References Cited in the file of this patent

UNITED STATES PATENTS

| | | |
|---|---|---|
| 2,783,648 | Stovall et al. | Mar. 5, 1958 |
| 2,828,626 | Samsel | Apr. 1, 1958 |
| 2,947,173 | Lash | Aug. 2, 1960 |
| 2,988,918 | King | June 20, 1961 |

FOREIGN PATENTS

| | | |
|---|---|---|
| 642,916 | Great Britain | Sept. 13, 1950 |